April 20, 1954     R. N. JOHNSON     2,675,698
STARTING SYSTEM FOR VIBRATION TEST APPARATUS
Filed Jan. 28, 1950     2 Sheets-Sheet 1

INVENTOR
ROBERT N. JOHNSON
BY *Harris G. Luther*
ATTORNEY

April 20, 1954   R. N. JOHNSON   2,675,698
STARTING SYSTEM FOR VIBRATION TEST APPARATUS
Filed Jan. 28, 1950   2 Sheets-Sheet 2

INVENTOR
ROBERT N. JOHNSON
BY Harris G. Luther
ATTORNEY

Patented Apr. 20, 1954

2,675,698

UNITED STATES PATENT OFFICE 2,675,698

STARTING SYSTEM FOR VIBRATION TEST APPARATUS

Robert N. Johnson, East Hartford, Conn., assignor to United Aircraft Corporation, East Hartford, Conn., a corporation of Delaware Application January 28, 1950, Serial No. 141,019

5 Claims. (Cl. 73—67)

This invention relates to apparatus for testing the physical properties of materials by subjecting said materials to vibration.

An object of this invention is the provision of efficient yet simple means of vibrating materials or mechanical systems over a wide range of frequencies wherein a controlled starting system is provided for bringing the test specimen up to a mode of natural resonant frequency.

Although vibration test apparatus have been developed whereby automatic vibration frequency and amplitude can be maintained, as for example by an electrical self-excitation loop, the transition from the time when the specimen is at rest to the time when the desired motion is obtained might be an erratic operation. In other words, in previous vibration testing apparatus utilizing a self-excited loop system, starting has been effected by advancing the amplitude controls to the point where noise signals or an actual mechanical blow on the specimen would provide energy to initiate self-excitation. As a result, the initial self-excitation signal response around the loop was of such a phase as to be completely arbitrary and consequently, for sustained vibration of the test piece, the phase adjustment as well as the amplitude controls would require considerable manipulation. In fact, under such starting conditions the controlling signal may have instantaneous characteristics so as to cause severe jumping of the specimen and at times causing damaging electrical surges in the electrical equipment. Thus, the test specimen is brought to a desired vibration by more of a trial and error procedure which is not conducive to accurate and dependable fatigue measurement.

It is the primary object of this invention to provide smooth controlled transition from zero to desired vibration of the test piece in a self-excited vibration system by initially providing oscillator excitation, and then, transferring without interruption to self-excitation so that the vibration remains constant in amplitude during the transition period thereby eliminating the possibility of overstressing the specimen.

Therefore, a particular feature of this invention resides in the provision of a completely controlled starting system for bringing the test specimen up to the desired vibratory motion whereby the apparatus can be electrically shifted over to permit continued and automatic control by self-excitation.

These and other objects of this invention will become readily apparent from the following detailed description of the drawing in which.

Figure 1:
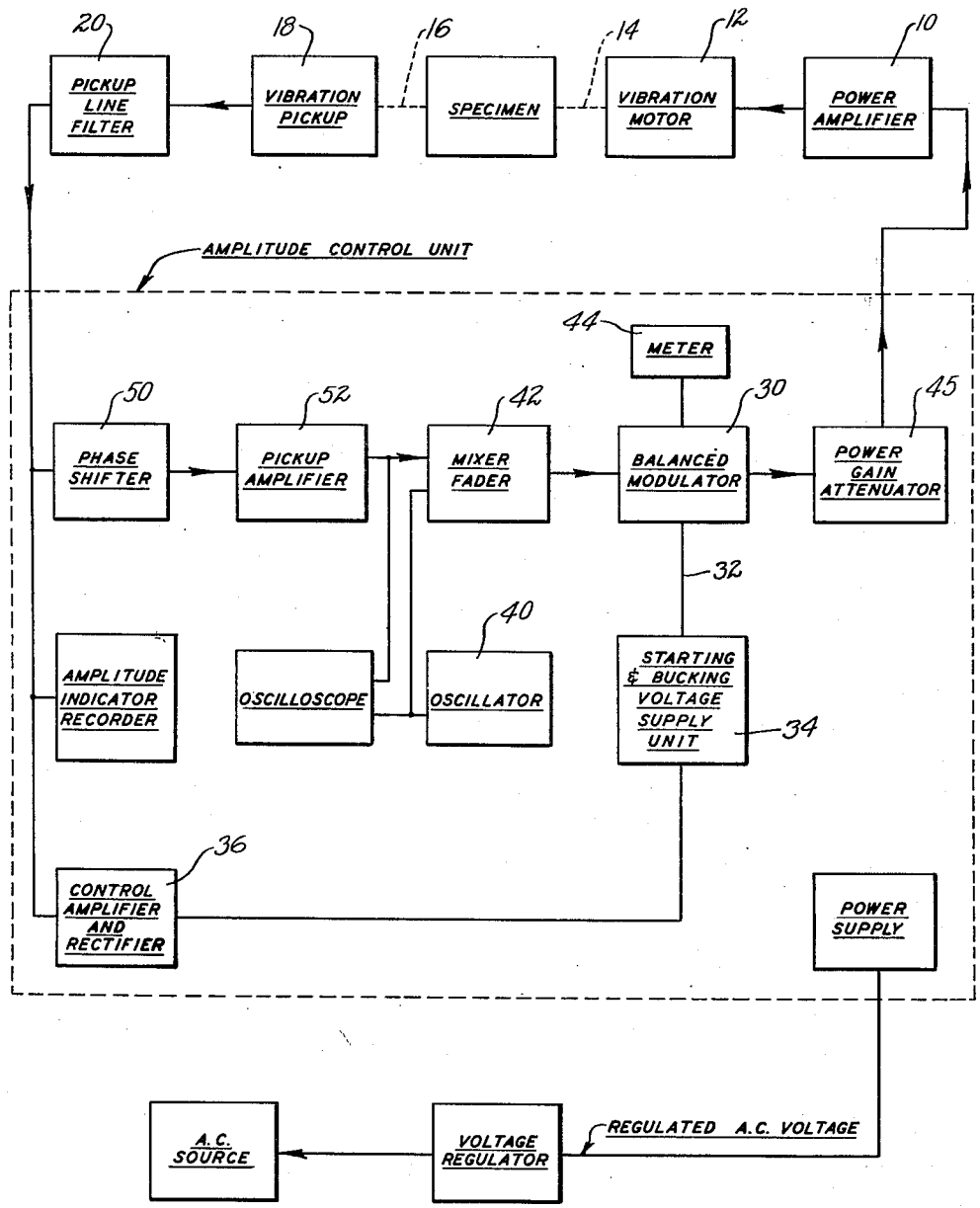
Fig. 1 is a schematic layout of the test apparatus with labeled electrical units well-known in the art being illustrated.

Referring to Fig. 1, a self-excitation loop is shown comprising an amplitude control unit (indicated by dotted lines) which supplies a controlling signal to a power amplifier 10 which in turn energizes a vibration motor 12. As indicated by the dotted line 14, the vibration motor is operatively connected to the test specimen to vibrate the same while the specimen in turn, as indicated by the dotted line 16, has operatively connected thereto a vibration pickup 18. The vibration pickup provides a signal to the pickup line filter 20, which is of the band pass type having cut-off frequencies of, for example, twenty and five hundred cycles per second, so as to prevent excessively high frequency oscillation and also to eliminate self-excitation of the fundamental low frequency mode of the entire mechanical assembly. The signal from the line filter 20 is then passed into the amplitude control unit as indicated by the arrow. The amplitude control unit, to be described more fully hereinafter, is provided with a source of A. C. power which is regulated to a desired voltage by a voltage regulator, as shown, and fed into a D. C. power supply which provides suitable voltages for operating the various elements of the amplitude control unit. The detailed power supply network is omitted herein for convenience as it does not form a specific part of this invention.

The primary function of the amplitude control unit is to maintain the specimen amplitude in a natural resonant mode at any desirable amplitude level commensurate with the power capabilities of the power amplifier 10 and the vibration motor 12. The normal operation of the test apparatus is based on a self-excitation technique whereby an A. C. signal from the vibration pickup 18 attached to the specimen is used as the voltage and frequency source which eventually drives the power amplifier for sustained vibration. It is necessary that the pickup signal be properly phased and that an automatic control of specimen amplitude be provided hence these functions are performed by the amplitude control unit which in addition includes suitable starting and monitory facilities.

As illustrated in Fig. 1, the major, normal electrical flow for the self-excitation loop is indicated by the arrows while the other components not connected by the arrows are used for amplitude control, monitoring, starting, and the supply of suitable operating potentials. For an understanding of the entire system it is best to describe the operation of the unit rather than to single out at this point the functions of any particular component of the system.

During starting, or during normal operation of the loop, the balanced modulator 30 provides a means for automatic control of the signal level around the self-excitation loop. It has a gain characteristic which is an inverse function of a controlling D. C. bias voltage which is impressed via the line 32 from the starting and bucking voltage supply unit 34. Normally the unit 34 is adjusted in relation to the control amplifier and rectifier 36 since the latter produces a D. C. biasing signal derived from the pickup signal which appears at the output of filter 20. In normal operation, only a relatively small biasing voltage is directed to the balanced modulator and hence for starting, the voltage supply unit 34 has a negative range of, for example, minus four to zero volts. A positive range of voltage is also provided in the unit 34 for a purpose that will become apparent hereinafter.

Hence, during starting, when no vibration pickup signal is being generated from the test piece and consequently when there is no output from the control amplifier and rectifier 36, the voltage supply unit 34 will be adjusted to provide a suitable negative D. C. bias voltage to the balanced modulator. Moreover, the amplifier 36 will be adjusted to zero gain upon initial starting so that during starting there will be no bias interference from this unit as a pickup signal is created. To provide a suitable starting signal, an oscillator 40 is provided which feeds a signal to the mixer-fader 42 which, in turn, for starting purposes, is set to pass only the signal of the oscillator to the balanced modulator. Since it is desired, for example, that the balanced modulator and mixer-fader combination have a nominal gain of one, a meter 44 reading the gain in relative decibels is provided so that the biasing voltage being fed to the modulator by a manual setting of the unit 34 can be adjusted to the value which produces the nominal operating gain. With the frequency of the generated signal set by the oscillator 40 at specimen resonance, the power gain attenuator 45 may be adjusted to obtain the desired signal level at the input to the power amplifier 10 to drive the specimen at the desired amplitude of vibration.

This method of power level adjustment insures that the balanced modulator is always operated at a point where its gain and control characteristics are closely defined since the nonlinear relationship between the balanced modulator gain and its biasing voltage might otherwise permit unstable operation of the system if an appropriate nominal operating point which is defined by the meter 44 were not consistently established. The balanced modulator is in fact an amplifier having a grid bias which is varied in accordance with the signal generated by the pickup 18 during normal operation thus causing a corresponding variation in gain. The amplitude control unit under these conditions now functions as a constant gain amplifier and the oscillator as the signal source drives the specimen since, as previously mentioned, the control amplifier 36 is set to a zero gain so as not to produce any variation in the biasing voltage being fed to the modulator 30.

The next step toward self-excitation of the system is obtained by introducing a suitable amount of a self-generated controlling signal. This is accomplished by reducing the bias voltage from the voltage supply unit 34 to a zero value and replacing it with an equal bias voltage by allowing the necessary amount of signal to pass through the control amplifier 36 which at this time will be receiving a signal from the pickup line filter. It should be noted that the control amplifier 36 is labeled as also being a rectifier inasmuch as it converts the A. C. signal from the pickup line filter into a controlling D. C. bias voltage. At this stage of operation the amplitude level and gain of the entire system is still the same although now it is generating its own control signal, i. e., via the control amplifier 36 and the voltage supply unit 34 to the balanced modulator 30.

Self-excitation can then be obtained by divorcing the system from its oscillator excitation. It will be noted that up to this point the mixer-fader 42 had been set so as to pass only the oscillator signal so that no signal from the pick-up line filter along the path of the arrows is passed beyond the mixer-fader. Since self-excitation is obtained by divorcing the system from its oscillator excitation it is necessary that the signal from the pickup line filter and the oscillator signal be matched in phase and magnitude so that a subsequent substitution of excitation signals can be made without variation in specimen vibration. This is accomplished by adjusting the phase shifter 50 and the pickup amplifier 52 so that an in-phase and equal magnitude presentation is obtained on the oscilloscope thus indicating that the pickup and oscillator signals are matched.

The oscilloscope is a conventional unit having its vertical and horizontal amplifiers of identical phase response over the frequency range of the equipment.

Figure 2:
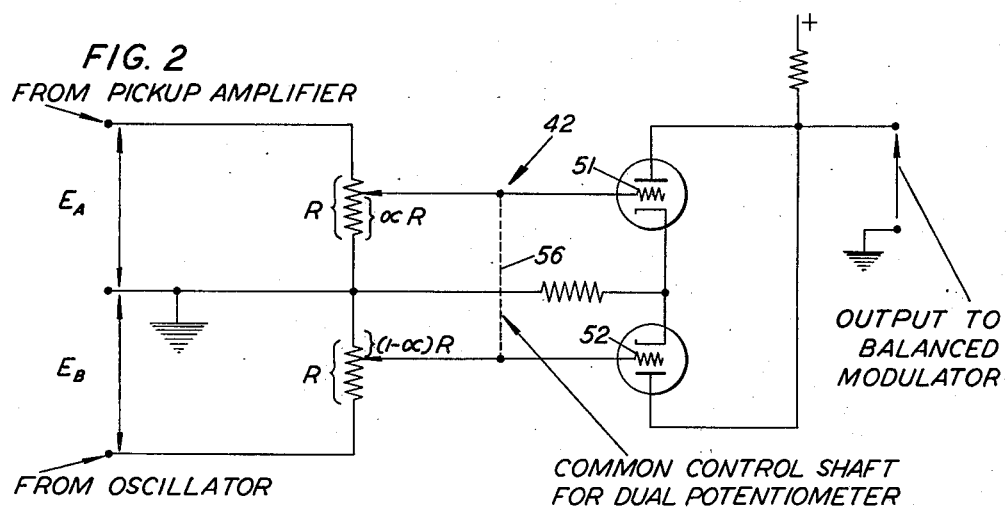
Fig. 2 is a schematic wiring diagram of the mixer-fader of Fig. 1.

The mixer-fader is capable of smoothly interchanging, one for the other, two signals of the same frequency phase and magnitude in such a manner that its output is constant during the mixing operation. Hence, the pickup signal is readily substituted for the oscillator signal in the system. As seen in Fig. 2 the mixer-fader unit is a double triode amplifier having a common plate load and a gain of about one. It has two input connections, one from the pickup amplifier and the other from the oscillator. The amount of signal from each channel which is presented to the mixer is controlled jointly by using a linear, dual, potentiometer. If the fractional amount of movement of control 56 is denoted by $\alpha$, then the signal presented to grid 51 of the mixer is $\alpha E_A$ and the signal presented to grid 52 is $(1-\alpha)E_B$ as can be seen in Fig. 2. Thus, in one extreme position of the control 56, only $E_A$ appears in the output and in the other extreme position, only $E_B$ appears, while proportionate parts appear for intermediate potentiometer control positions.

When running self-excited the control amplifier 36 is operated at a suitable gain thus providing, via the voltage supply unit 34, a controlling bias voltage (proportional to the pickup line signal) to the balanced modulator which because of its inverse gain characteristics makes possible a stabilized and controlled specimen amplitude. The degree of correction for a given change in the system, i. e., the control sensitivity, is influenced by the series combination of the control amplifier 36 and the bucking voltage supply unit 34. As previously mentioned, the voltage supply unit 34 has a small negative range and a positive range of any desirable magnitude, for example, a positive range up to one hundred volts. The polarity mentioned here is by example only since all that is necessary is that the voltage supply unit 34 opposes the D. C. bias generated by the control amplifier 36 and since the normal operating bias voltage required for the balanced modulator is relatively small a large bucking voltage from the supply unit 34 demands a slightly larger controlling bias voltage from the amplifier 36. In effect the resultant controlling bias applied to the balanced modulator might be the difference between two relatively large voltages of similar magnitude one being the stable bucking voltage of the unit 34 and the other the control bias which fundamentally varies with the specimen amplitude. With a differential signal of this type a high sensitivity of control can be realized. Since the bucking voltage from the supply unit 34 is adjustable and the gain of the control amplifier 36 is adjustable within limits, the control sensitivity may be varied by a considerable amount; however, the limits of control sensitivity are established by the mechanical characteristics of the specimen and also by the amplitude at which it is run. Of course, it is apparent that some intermediate degree of sensitivity will be desirable inasmuch as an extreme of sensitivity may cause hunting in the system.

Figure 3:
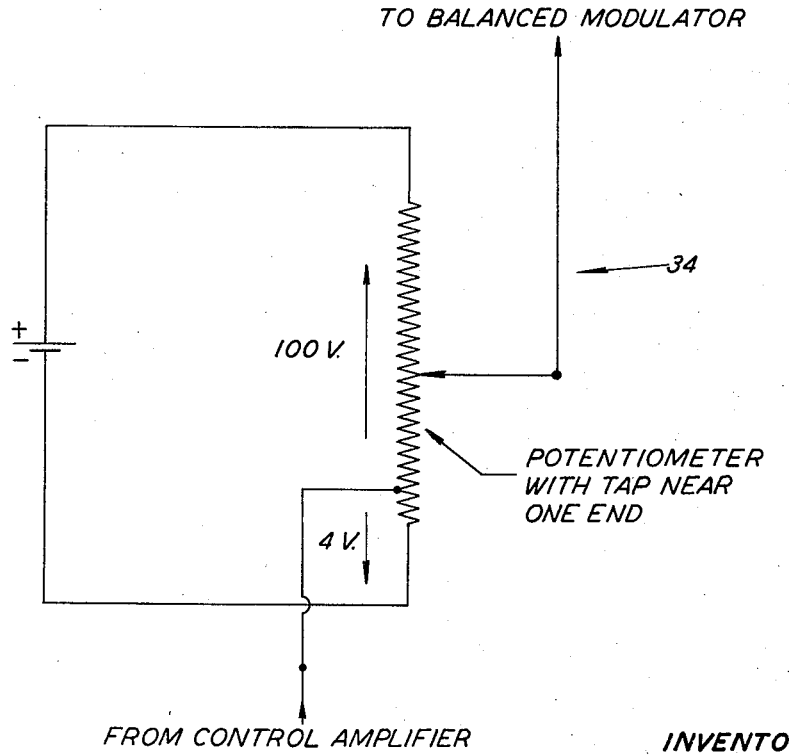
Fig. 3 is a schematic wiring diagram of the starting and bucking voltage supply unit of Fig. 1.

The starting and bucking voltage supply unit, illustrated better in Fig. 3, provides a voltage source variable for example from −4 to +100 volts which is placed in series with the control amplifier and balanced modulator. Thus, in starting a specimen, when the output from the control amplifier is zero, the required bias (−2 volts) can be provided by the starting and bucking supply to operate the balanced modulator at the nominal gain level until the specimen is vibrating. The starting bias is then reduced to zero and replaced by the controlling bias signal from the control amplifier 36. The positive bucking supply voltage is used to increase control sensitivity as described above.

It is therefore apparent that as a result of this invention a simple yet accurately controllable testing apparatus is provided wherein during starting and in subsequent normal operation the vibrations of the test specimen are under complete and well-defined control.

Although only one embodiment of this invention is illustrated and described herein it is obvious that various changes may be made in the components and the arrangement thereof without departing from the scope of this novel concept.

What is desired by Letters Patent is:

1. In a materials testing machine, electrically excited means for vibrating the test piece at its natural frequency including electrically operated mechanism for controlling the amplitude of vibration of said test piece, power means actuated by the vibrations of said test piece for exciting said vibrating means, said electrically excited means and said power means forming a self-excited loop, manually controllable electrical means operatively connected to said vibrating means for initially starting the vibrations of said test piece, comparator means operatively connected to the loop and said starting means for measuring the amplitude and phase of said power means and said electrical means, and means operatively connected with said loop for disabling said power means during starting and including operative connections to said starting means for switching from said electrical starting means to said self-excited loop when the amplitude and phase of said power means and said electrical starting means are substantially identical.

2. In an electrical vibration apparatus for testing the physical properties of a specimen having a self-excited loop, said loop comprising power operated vibration means for vibrating the specimen, pickup means operatively connected to the specimen for generating a pickup signal responsive to the vibration characteristics of the specimen, and an amplitude control unit for automatically controlling the amplitude of vibration of the specimen, said amplitude control unit comprising, a circuit for closing the loop including, means for manually varying the phase and amplitude of said pickup signal, modulator means, and power attenuating means for manually varying the desired amplitude characteristics of the loop energy being passed to the specimen vibration means, a biasing circuit including amplifying means responsive to the magnitude of said pickup signal for introducing a controlling bias to said modulator means, and starting mechanism for controllably bringing the specimen up to the desired vibration comprising oscillating means for introducing a starting signal to said modulator means, manually controlled biasing means operatively connected to said biasing circuit for obtaining an output from said modulator means of desired characteristics, means for comparing the characteristics of the starting signal and the pickup signal resulting from the starting vibrations of the specimen, said means for manually varying the phase and amplitude of said pickup signal being utilized for adjusting said pickup signal to match with said starting signal, and means for converting from starting operation to automatic operation comprising control mechanism for adjusting said biasing circuit, and manually controlled mixing means located in said loop for substituting said pickup signal for said starting signal.

3. In a materials testing apparatus for vibrating a specimen comprising a self-excited loop for self-sustained vibrations, said loop including electrically operated vibration mechanism for vibrating the test piece and power means responsive to the vibrations of the specimen for generating a controlling signal, modulator means, and an electrical unit for controllably passing said signal to said modulator; means responsive to the magnitude of said controlling signal for producing a primary biasing signal to said modulator means to effect said controlling signal and maintain a controlled specimen amplitude including means for manually varying said biasing signal, in combination with a starting circuit comprising, a source for producing a starting vibration signal through said electrical unit, said unit being capable of passing to said modulator only said starting signal during starting, a secondary electrical bias source for impressing a controlling secondary bias on said modulator commensurate with the starting signal passing therethrough to obtain a constant gain, the biasing signal from said primary biasing signal means being reducible to zero during starting, means for manipulating said primary and secondary biasing means whereby said primary biasing means effects said modulator, means for comparing the phase and amplitude characteristics of said starting signal and said controlling signal after vibration is initiated in the specimen, means for varying the phase of amplitude of said controlling signal to synchronize with said starting signal, and means for operating said electrical unit for simultaneously interchanging said controlling signal for said starting signal and passing same to said modulator means to permit automatic excitation and control of said loop.

4. In an automatic vibration test apparatus for testing the physical properties of a test specimen having a self-excited loop system including mechanism for vibrating the specimen, a signal producing vibration pickup responsive to vibrations of the specimen and modulator means; a controlling biasing means operatively connected to said modulator and said pick-up, the output of said biasing means being proportional to the vibration pickup signal, means for controllably starting the vibrations of the test piece including a source of electrical oscillations and manually controlled biasing means operatively connected to said loop system and said modulator means respectively, and means in said loop for interchanging said starting signal means with said pickup signal for transmission to said modulator means and converting to automatic operation whereby the loop system remains substantially unchanged in electrical characteristics.

5. In a materials testing machine, electrically excited means for vibrating the test piece at its natural frequency including electrically operated mechanism for controlling the amplitude of vibration of the test piece, means operatively connected to the test piece and generating an electrical signal in response to the vibrations of the test piece for exciting said vibrating means, said electrically excited means and said signal generating means forming a self-excited loop, signal producing electrical means operatively connected to said vibrating means for initially starting the vibrations of said test piece, means for modifying the phase of the signal from said signal generating means, mechanism operatively connected to said signal generating and signal producing means for disabling self excitation by said loop including electrical elements for replacing the signal of said signal producing means with the signal of said signal generating means, said last mentioned mechanism including an electrical unit for maintaining the characteristics of the signal flowing to said vibrating means substantially constant during replacement of said signals.

References Cited in the file of this patent
UNITED STATES PATENTS

| Number | Name | Date |
|---|---|---|
| 2,300,926 | Hutcheson | Nov. 3, 1942 |
| 2,361,396 | Gross | Oct. 31, 1944 |
| 2,403,999 | Read et al. | July 16, 1946 |
| 2,500,764 | Macgeorge | Mar. 14, 1950 |